Feb. 15, 1949.  P. SCHWEIZER  2,461,573
MACHINE FOR STUFFING NEWSPAPERS OR
SIMILAR SHEET MATERIAL ASSEMBLAGES

Filed April 2, 1945  4 Sheets-Sheet 1

INVENTOR:
Paul Schweizer
BY Morrison,
Kennedy & Campbell
ATTORNEYS.

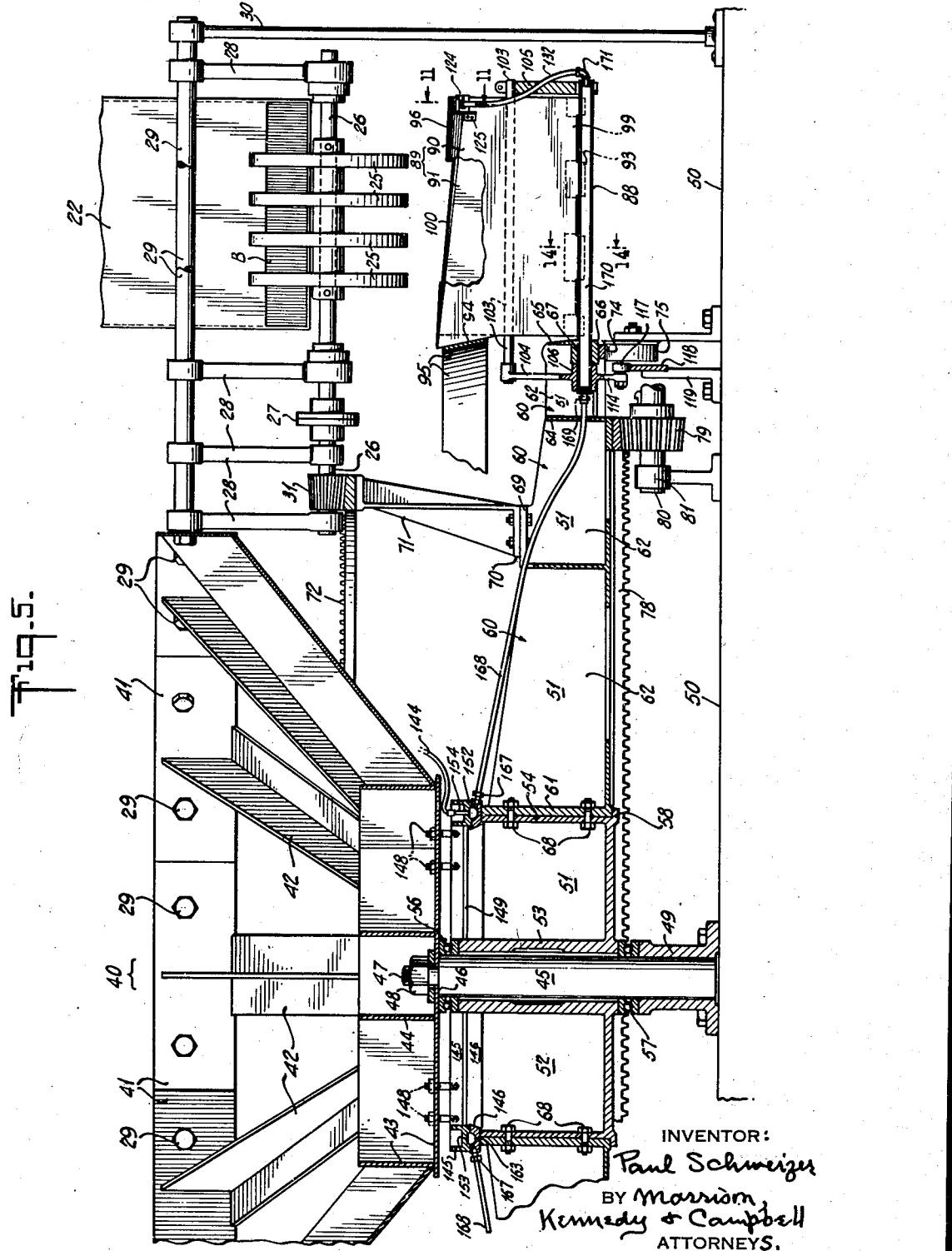

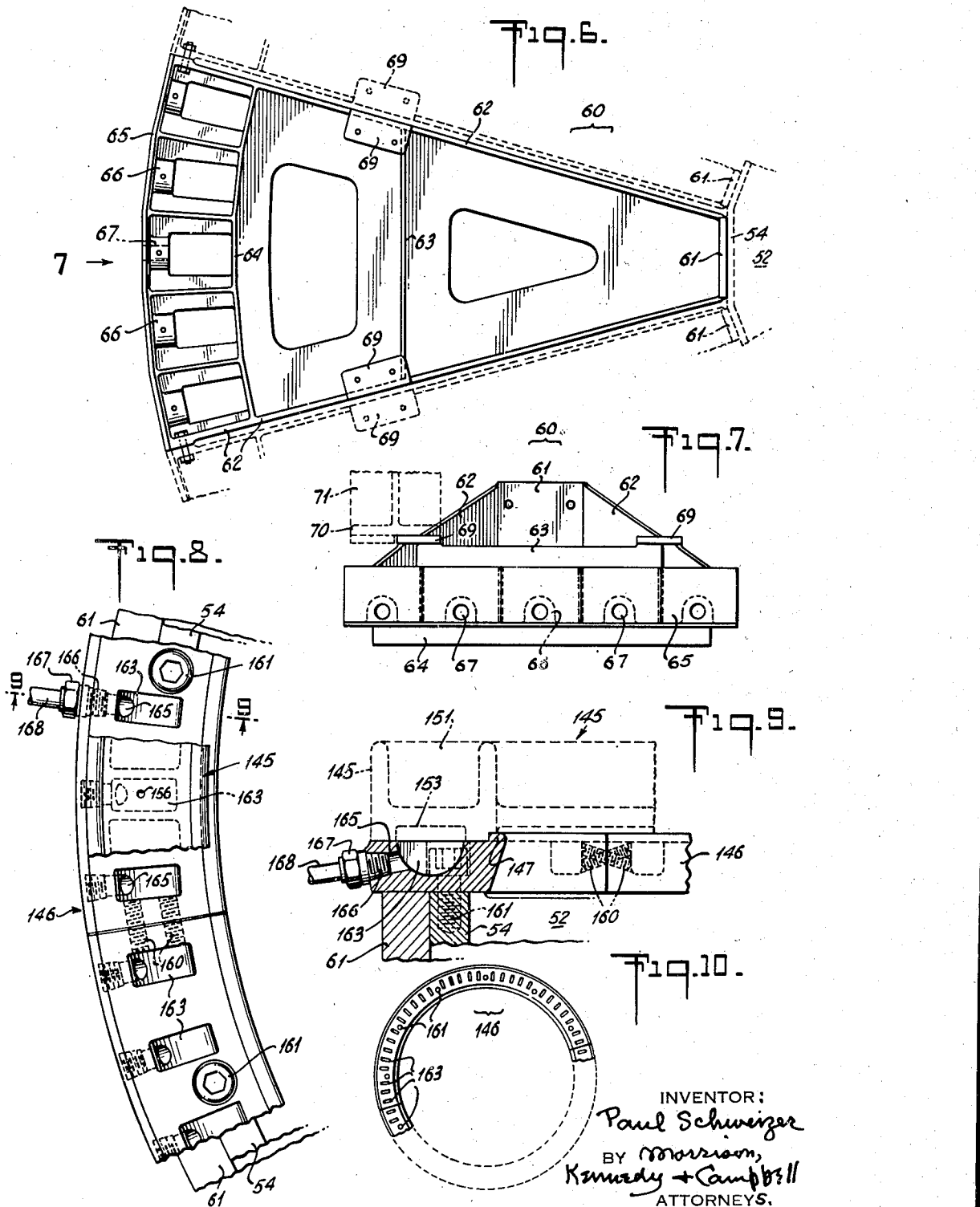

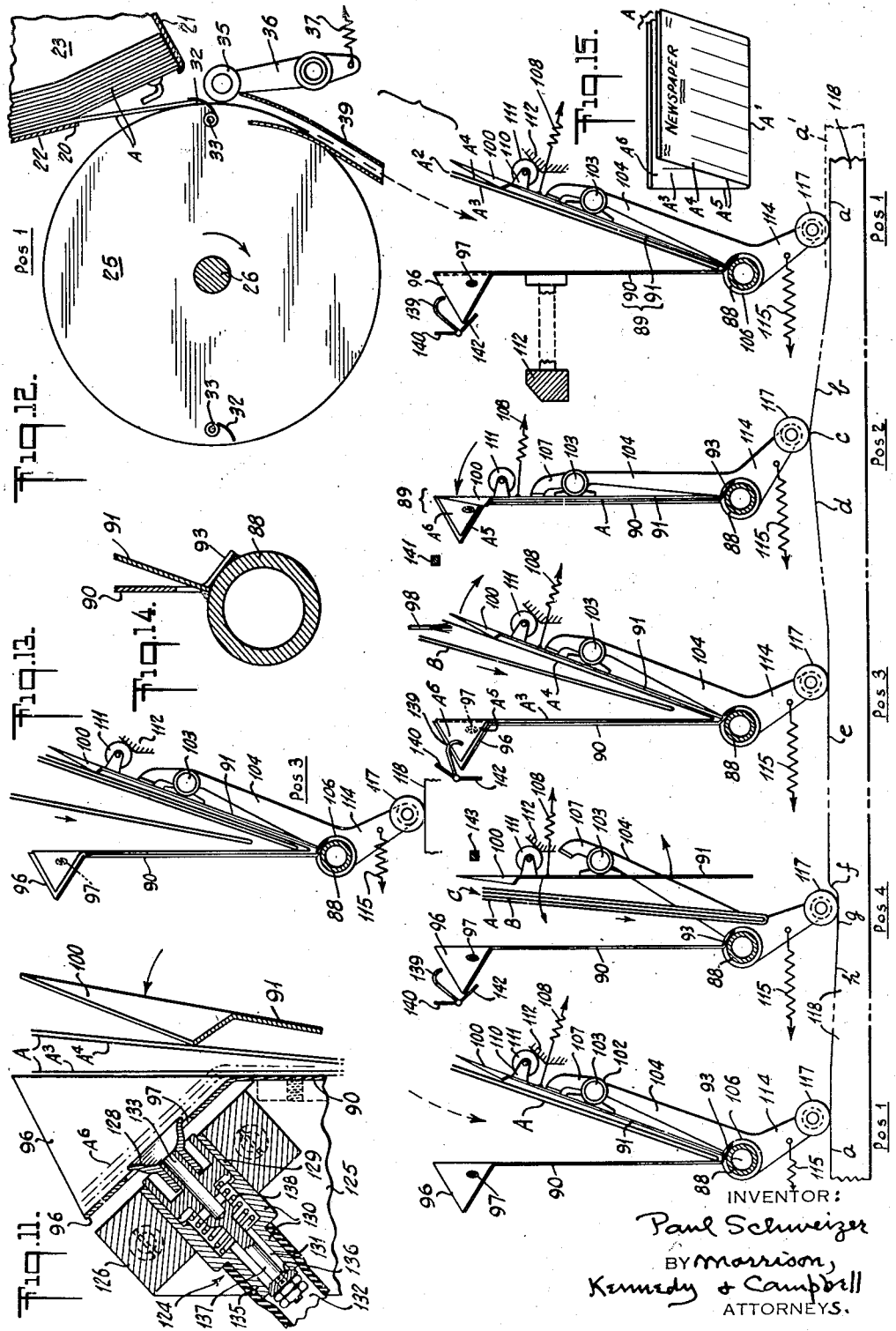

Patented Feb. 15, 1949

2,461,573

UNITED STATES PATENT OFFICE 2,461,573

MACHINE FOR STUFFING NEWSPAPERS OR SIMILAR SHEET MATERIAL ASSEMBLAGES

Paul Schweizer, Easton, Pa., assignor to T. W. & C. B. Sheridan Company, New York, N. Y., a corporation of New York Application April 2, 1945, Serial No. 586,084

23 Claims. (Cl. 270—55)

1

This invention is a novel machine for stuffing newspapers or similar sheet material assemblages; with reference principally to the insetting and enclosing loosely within the folded outer cover or jacket section of a plural-section newspaper or the like, of one or several folded inner sections; and thus, in the case of a newspaper, associating and assembling complete sets of the sections or inserts thereof, each set accumulated as a segregated group, with all but the first or outer section placed inside of such outer section, for convenience of handling, distributing and selling. Such operations are known as stuffing, and a leading prior example of a workable newspaper stuffing machine in that shown in the patents of W. B. Story such as No. 1,258,720 of March 12, 1918; some other proposed machines being those shown in the patents of S. Halvorsen No. 1,257,482 of February 26, 1918, and C. J. Ellsworth No. 1,766,117 of June 24, 1930, and the more recent patent of I. Tornberg No. 2,279,270 of April 7, 1942; none of which was wholly satisfactory in all practical respects, especially in respect to the rate of handling and output of stuffed newspapers or analogous assemblages.

The general objects of the present invention are to provide a stuffing machine which is relatively small and compact, occupying a minimum of floor space for its capacity, while at the same time being rugged, smooth-running and reliable. A particular object is to afford such an apparatus which is capable of operating at considerably higher than the usual speeds, so as to afford an increased output of stuffed newspapers per minute, and with continuous operations between a series of stacked supplies of the several sections of the newspaper to the final delivery of the stuffed newspapers.

Additional objects are to improve the mode of manipulation of the jacket and other sections being assembled, to afford enhanced convenience of operation and control, and to provide a machine which is adapted to operation upon newspapers and the like having a greater or lesser number of sections, and which has means for adjusting or prearranging the elements to accommodate newspapers or similar objects of varying sizes.

Other and further objects and advantages of the invention will be explained in the hereinafter following description of an illustrative embodiment of the invention or will be understood by those conversant with the subject. To the attainment of such objects and advantages the present invention consists in the novel stuffing machine, and the novel features of operation, combination, arrangement, mechanism and detail herein illustrated or described.

In the accompanying drawings, on Sheet 1,

Fig. 1 is a general plan view on a small scale illustrating a stuffing machine embodying the present invention and showing the general arrangement of the frame and mechanisms thereof, the mode of drive of the assemblage conveying rotor and other rotating parts, the hoppers and infeed means for newspaper sections and the delivery of the stuffed newspapers.

Fig. 2, on the same scale, is a front elevation of the machine of Fig. 1 shown partly in central vertical section and otherwise partly broken away to show interior parts.

Fig. 3, on a larger scale, is a top plan view of the upper or fixed ring of a pair of suction rings to be described, the same shown partly broken away for better disclosure.

Fig. 4 is a vertical sectional view taken on the radial section line 4—4 of Fig. 3 looking from the right.

On Sheet 2, Fig. 5, on an intermediate scale, is a vertical sectional view taken on the diametrical section line 5—5 of Fig. 1, looking from the front.

On Sheet 3, Fig. 6 is a detail top plan view, on a larger scale than Fig. 5, of one of the twelve structural segments which constitute the main part of the built-up rotor or rotary conveyor of the machine.

Fig. 7 is an elevational view looking radially inwardly from the left side of Fig. 6, along the arrow 7.

Fig. 8 is a top plan view of an arcuate length of the under suction ring which is secured to and turns with the rotor, with a short extent of the upper suction ring shown superposed thereover to disclose the relation between the two rings.

Fig. 9 is a vertical sectional view taken on the section line 9—9 of Fig. 8, with certain surrounding parts indicated including in dotted lines a portion of the upper suction ring, above the under ring.

Fig. 10, on a considerably smaller scale, is a top plan view of the complete under suction ring detached.

On Sheet 4, Fig. 11 is a fragmental vertical sectional view taken on the line 11—11 of Fig. 5 of the upper part of one of the many conveying pockets carried by the rotor and illustrating the preferred structure of a suction holding device mounted thereon and performing one of the essential operations of the pocket.

Figure 1:
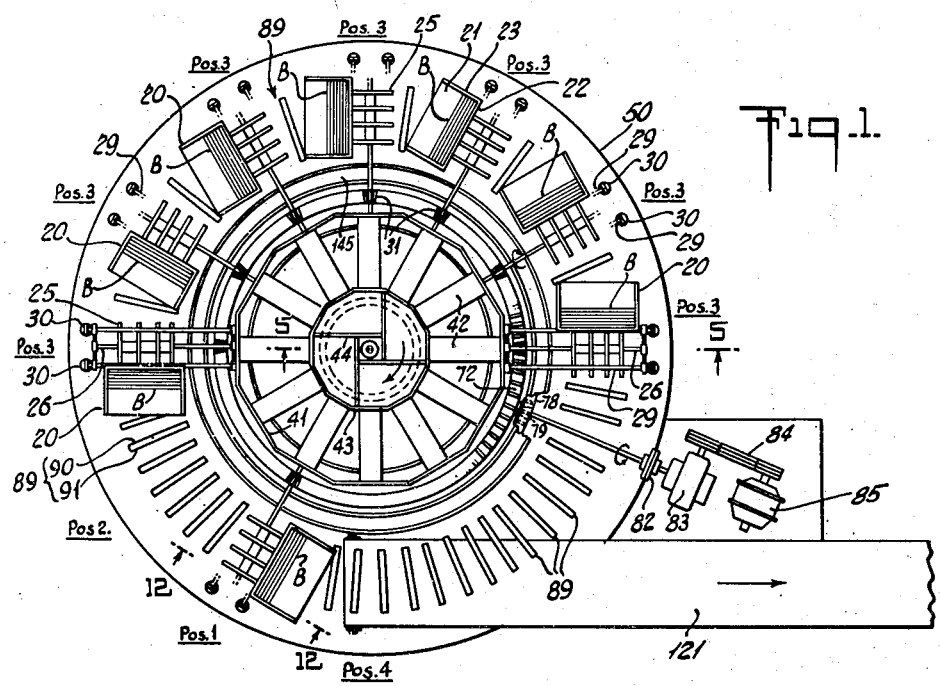

Fig. 12 is an elevational view, partly in section, looking radially inwardly, namely, at what will be considered the first one of the successive positions through which each pocket passes, the section being taken on the section line 12—12 of Fig. 1, whereat the receiving pocket is in its open condition ready to receive the outer or jacket section of a newspaper from the corresponding overhead hopper and extracting devices shown on the figure; and this figure being also extended leftwardly as a combined development showing subsequent pocket positions 2, 3 and 4, and finally position 1 repeated, in each case looking radially inwardly, and with the pocket-operating fixed cam indicated therebelow and shown broken away between the illustrated positions.

Fig. 13 is a view similar to position 3 of Fig. 12, illustrating the preferred mode of handling the successive stuffed sections of the newspaper inserted within each pocket at the several successive positions that are numbered 3 as seen in Fig. 1.

Fig. 14 is a vertical sectional view taken on the section line 14—14 of Fig. 5, looking from the right, with parts beyond omitted, and showing a preferred mode of mounting the first or fixed wall of each pocket upon the hollow axle of the pocket. Fig. 15 shows a jacket section in perspective.

The machine comprises cooperating elements which may be generally described as follows. There is an endless series or train of conveying pockets or receptacles with mechanism for advancing the same around a substantially horizontal endless orbit in a manner for each pocket to receive first a jacket section and then inner sections at predetermined receiving stations or locations along the travel path and to discharge the completed assemblage at a subsequent delivery station. The pockets preferably stand out radially, carried upon a driven rotor, and each comprises a pair of relatively movable walls presenting normally or initially a receptacle closed below and open above to receive and hold edgewise the jacket section with its fold downward and therewithin the inner sections of the assemblage. There is means provided for relatively moving or swinging the walls of each of the pockets, as it advances around the orbit, to cause the walls first, beyond the jacket depositing station to close together above and thereupon to reopen with the jacket section thereby opened and supported in V-form, and second, beyond the last of the other receiving stations to open below thereby to discharge the assemblage at the delivery station, and third, therebeyond to close below so as to resume initial receiving position before arriving again at the jacket receiving station. Supplementing the operation, by which the jacket section is closed and allowed to reopen, is means to hold one of its half sections against one pocket wall while the other half section falls away with the other pocket wall, or some equivalent means to bring the jacket section into V-form to receive the inner sections. The final discharge may be upon an outfeeding conveyor or belt traveling to a convenient handling place.

Throughout the drawings the complete newspaper assemblages, and the sections thereof, are designated by reference letters, while the parts of the machine are designated by numbers. The plan view Fig. 1 shows that the assembling pockets 89 are carried around a circular orbit between a series of operating positions 1, 2, 3 and 4, which positions are indicated also in the diagrammatic development of Fig. 12. In position 1 the first or cover section or jacket A of each newspaper assemblage is extracted from an overhead hopper 20 and deposited in the pocket traveling therebeneath, as best seen at the righthand side of Fig. 12. At position 2 on Fig. 1 there is no extraction or depositing of section, but this interval is utilized to open into V-shape the deposited cover section so that at position 3 the first of the inner sections B can be deposited within the opened cover section; and there are shown seven stacks with extracting means for handling any number, from one up to seven, of inner sections, according to the size of the newspaper. Position 3 therefore is repeated seven times, and these are followed by idle travel of the pockets up to position 4 which is the delivery position, at which the completed newspaper assemblage C is discharged from the pocket, preferably to an outfeeding conveyor 121. The advancing travel of the numerous receiving pockets is in a horizontal and preferably circular orbit, effected by means of a centrally pivoted rotor 51 which is driven continuously so that each of the pockets passes from the infeed position 1 through position 2 to a succession of positions 3 and finally around to delivery position 4.

A fixed cam 118, with contour parts 118a to 118h, is shown as a means for causing the successive operations of each of the pockets 89 as it travels around through and between positions 1, 2, 3 and 4 and back to position 1 for repetition of cycle.

For purposes of terminology each newspaper may be described as comprising its jacket or cover section A, shown separately in Fig. 15, and the inserted inner sections B, varying in number, the whole constituting the complete assemblage C. As seen also in Figs. 11, 12 and 13 each cover section A has its closed lower edge A', which is the final fold or refold of the section as it comes from the press, and the openable upper edge A², the section being delivered from the stack or hopper into each of the pockets in this manner, with the final fold at the bottom of the pocket. The two halves of each cover section as folded are designated as the leading half A³ and the trailing half A⁴, which initially lie in contact or close together but are required to be opened up or separated apart into V-shape before an inner section is deposited in the pocket. For reasons which will appear the backfold A⁵ of the jacket section, extending along the back of both the leading and trailing halves, should be at the radially outer part of the edgewise deposited section. For the purpose of opening the jacket to V-form a special operation will be described by which the upper edge, or preferably one of the upper corners A⁶ of the leading half section A³, being the corner near the backfold A⁵, is manipulated and held away from the other half section, to maintain the opened cover section in readiness to receive the designated number of inner sections.

The separating and feeding of the successive newspaper sections from their respective supplies may be according to conventional modes, a hopper 20 being shown for each newspaper section, wherein is maintained a supply of such sections, preferably standing edgewise, from which supply or stack the first or foremost section may be detached, extracted and guided downwardly for deposit into the pocket.

The hoppers and the means of extraction may be substantially the same throughout the orbit of travel, although the handling of the sections in each of the pockets differs in that the cover section must be received and opened up in the pocket to accommodate the inner sections. In Fig. 12 the hopper 20 is shown as comprising a bottom wall 21 and an end wall 22, both preferably on a slant, the end wall terminating short of the bottom wall to provide a gap through which the successive sections may be detached and extracted. The hopper is completed by side walls 23.

A detaching means, such as a suction device to engage and swing outwardly each foremost section is to be understood, although not herein shown. Indeed the steps of detaching, extracting and depositing form in themselves no part of the present invention, but may follow generally the similar means for handling signatures in signature gathering machines, such for example as the machine shown in U. S. patent of Kleineberg No. 2,251,943 of August 12, 1941. The extracting means may comprise the extracting drum 25, shown as an open structure of four disks, continuously rotatable adjacent to the front wall exit of the hopper. The rotary extractor 25 is shown mounted on a shaft 26, arranged substantially radially in the machine, and turning in a series of bearings carried by depending hangers 28 supported by an overhead frame rod 29 or two such rods, each of which in turn is supported at its outer end, as seen at the righthand side of Fig. 5, by a tall standard 30. The support of the other end of rod 29 will be later described.

At each hopper, the extracting drum is provided with grippers 32 adapted to grasp the lower or closed end of each detached section A or B, so that, under the continuous rotation of the drum, the section A or B is pulled downwardly and out of the hopper. As shown, the drum preferably carries a plurality of grippers, two opposite grippers 32 acting in sequence as the drum brings them around to the extracting point. Each gripper is mounted upon a gripper shaft 33, so that it can be swung between the open position shown at the lefthand side of Fig. 12 and the closed or gripping position at the righthand side of Fig. 12. The seat upon which each gripper bears to grip the section may be a block of rubber inset flush at the drum periphery. The means of actuation of the grippers is not herein shown but may be substantially on the principles disclosed in the prior signature gathering patent hereinabove enumerated.

In order that each gripper 32, after engaging and pulling down each signature partway, may be released, means is provided to continue the extraction and downward transfer of the section after the release of the gripper. This is performed by a presser roll 35, being an idler mounted upon a swingable lever 36 pulled upon by a spring 37 of strength to press the roll forcibly toward the drum itself. The lever may be actuated to retract the roll between feedings. When the gripper has conducted each section downwardly until its lower closed edge is beyond the point of contact between roll and drum, the roll applies its pressure upon the signature, which provides adequate means for continuing the extraction and downward travel of the section. Completing the description of this part of the disclosure, there is shown a chute 39 into which each section, after gripper release, is thrust downwardly by the rotation of the drum, the chute at its lower part being so arranged that the section is safely deposited within the open conveyor pocket, shown in Fig. 12 as standing well open at positions 1 and 3 whereat the sections are fed from above into the pockets.

The drive of each hopper mechanism, as to its extracting means may be effected through its shaft 26 which, at its inner end carries a pinion 31 driven as by a gear 72 to be described, all in synchronism with the conveyor and pocket travel. Between the drum 25 and pinion 31 each shaft contains a coupling or clutch 27, which can be used to set the timing of the drum and extraction relative to the travel of the pockets 89 to be described.

Referring next to the frame of the machine and the fixed elements in general, there is shown an elevated central frame member or headframe 40, which is a fixed hollow body, substantially open above and below, and with an upper rim 41 shown formed with flat sides, in this case twelve in number, eight of which give support to the inner ends of the eight pairs of overhead radial frame rods 29, the twelfth rod being omitted, and eight of the rods giving support through the hangers 28 to the bearings 26 of the shafts of the section extracting drums. The central head or head frame 40 of the frame has downwardly-inwardly sloping side pieces or braces 42 interconnecting the upper rim 41 with a flanged and twelve-sided bottom member 43 which may be a casting and having bracing webs 44 surrounding the central portion of the bottom piece, which has a central circular aperture.

The headframe 40 thus described is shown mounted atop a central stationary post 45, which constitutes not only a fixed frame part but a vertical axle about which rotates the rotor or pocket-carrier of the machine as will be described. The upright post 45 is of solid structure and near its top end is reduced in diameter to form a shoulder 46 upon which rests the bottom web or wall of the bottom piece 43, the post having a threaded extension 47 engaged by a nut 48 adapted to be tightened to fix securely in place the bottom piece 43 and thereby the entire headframe 40, which is a'so stabilized in its central position by the numerous radial overhead frame rods 29 whose inner ends are bolted fixedly to the polygonal upper rim 41 of the headframe. The central post 45, in the nature of an enlarged upright stud or axle is held in a fixed position by being set down into a foot member or upright socket 49 which in turn is bolted down fixedly upon a general base 50, which also gives support to the tall standards 30 at the periphery of the machine and other base members inwardly thereof as will be described. The upper end of the post socket member 49 terminates well below the shoulder 46 of the post, leaving an ample vertical space between them for the accommodation of the rotor to be described and the bearings upon which it rotates about the post.

Figure 2:
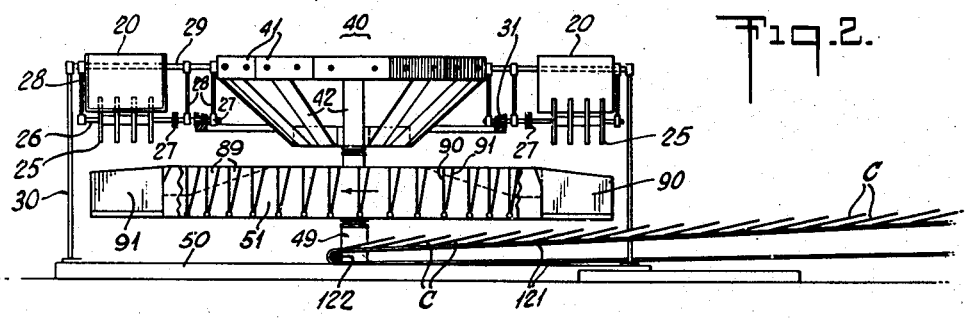

Referring next to the rotor 51, best shown in Figs. 1, 2 and 5, this constitutes a large rotary conveyor for the pockets in which the newspapers are stuffed, and it turns about a vertical axis thus providing a horizontal circular orbit of travel. As a specific instance the rotor may be of the order of eight feet in diameter and carry as many as sixty pockets, at or near the rotor periphery, the pockets arranged radially or radiating from the rotor periphery so as to pass beneath the series of section supply means or hoppers and above the final outfeeding means for the stuffed products.

The rotor 51 is a mechanical structure built up of numerous parts, central, radial and peripheral, arranged to be rotated about the central stud or post 45. The central rotor member 52 is in the nature of a hub, surrounding the post, with an inner cylindrical wall or sleeve 53 and a surrounding outer wall 54 preferably having flat sides, for example twelve in number. For smooth and wearless rotation there may be ball bearings 56 and 57 arranged respectively between the upper rim of the sleeve 53 and the adjacent wall of the headframe bottom piece 43, and between the lower end of the sleeve 53 and the top end of the socket member 49 in which the post is supported. The described hollow twelve-sided polygonal central or hub member 52 serves for the support of the surrounding members of the rotor, and for supporting purposes the foot of the outer wall 54 of the hub member is extended outwardly as a foot flange 58.

The rotor parts surrounding the hub member comprise a substantial number, as twelve, radiating members or sectors 60, interconnected into a rigid rotor structure adapted, at the periphery, to carry the series of pockets to be described. The several sectors may be identical and the construction of each thereof may be substantially as shown in Figs. 6 and 7. The hub member 52 is of substantial vertical dimension, while each of the sectors is relatively tall in its inner end, tapering to a considerably lower height at its outer end, which explains the appearance indicated in Fig. 7, which is a view looking radially inward at the left side of the top view Fig. 6. Each sector is shown as formed with a tall inner wall or web 61 resting upon the foot flange 58 of the hub and advantageously connected otherwise to the hub wall 54 as by bolts. Extending outwardly from the inner wall 61 are opposite side webs 62 each to be interconnected with the corresponding web of the adjacent sector, as will further appear.

Extending between the side webs are shown a first or taller cross web 63 and a second or shorter cross web 64, and therebeyond at the periphery is a wall or web 65, the entire system of such peripheral walls constituting the outer rim of the rotor. By this system of transverse walls and webs each sector is rendered rigid and is divided into three compartments, enclosed laterally but preferably open above, and the bottom walls being apertured for lightness. The sectors may each be composed of a single piece of metal, preferably cast rather than shaped from sheet steel, and the same is true of the central or hub member of the rotor; or the method of welding component sheet steel pieces may be employed.

The general structure of the rotor having thus been outlined, certain of its details may next be referred to. Within the peripheral wall 65 of each sector is shown in Fig. 5 a boss 66, which is hollow, being bored at 67 to receive certain parts of the pocket supports to be described. Five such bosses and apertures may be provided for each of the twelve sectors. For interconnection of the several sectors into a unitary rotor, each sector at each side, near to the cross web 63, is shown formed with a shelf or flange 69, partly overlying the web 63 as well as the web 62. Two of these flanges 69 will match each other on two adjacent sectors, as indicated on Fig. 6, and they may be used for consolidating the sectors, by means of a plate 70, overlying the matched flanges and secured or bolted thereto. Or bolts 68 may connect 61 to 54.

This described arrangement may be utilized for communicating drive from the rotor to the hopper mechanisms. Thus the plate 70 may be considered as a base member, bolted down upon the two half-shelves 69 and carrying above it an upstanding bracket or standard 71. The series of such standards extending around the rotor, may operate jointly for the support of a large ring gear 72, attached on top of the top flanges of the standards, in a position to mesh with and to drive the pinions 31 of the shafts 26 of the hopper or infeeding mechanisms. Preferably the pinion 31 and ring gear 72 are of the bevel type. By this interconnection between the pocket-carrying rotor and the extracting and depositing mechanism actuated by the shaft 26, these portions of the general machine are operated in proper timing for the correct synchronization of their action; that is to say the section feeding mechanisms supply the downwardly deposited newspaper sections at the correctly proper points of time to be received safely within the open conveyor pockets traveling therebeneath. As will further appear, each of the pockets has an ample receiving opening at its upper portion, so that there is no difficulty in properly receiving each section within the open pocket, during travel thereof; and this construction and operation therefore permit the rotor and pocket travel to be continuous, improving the smooth running qualities of the machine and permitting an unusually high rate of output of the finished product or stuffed newspapers.

In order to steady the rotation of the rotary conveyor 51 it is shown provided with a rolling supporting means near its periphery. Thus a large wear-ring 74 is shown attached beneath the peripheral rotor wall 65 and extending continuously around the rotor rim; this ring resting upon a system of several supporting rollers 75 mounted at the top of short brackets 76 attached to the machine base 50. By shaping the rollers with an inclined flange they assist also to keep the rotor in concentric operation. As thus stabilized the rotor may be power-driven as follows. There is shown at the under side of the rotor, preferably nearer to its periphery than to its hub, a ring gear 78, which may be formed in sections and attached to the series of rotor sectors. The teeth of the ring gear 78 mesh with the teeth of a driving pinion 79 which is secured upon a drive shaft 80 turning in bearings 81. These parts are seen in Fig. 5, and by referring to Fig. 1 it will be seen that the shaft 80 is connected by a coupling 82 with the slow shaft of a speed reducer 83, the fast shaft of which is driven through a belt 84 from a drive motor 85, which may be an electric motor.

Referring next to the conveying pockets and their mountings, there may be first described the means by which the many pockets are secured radially to the periphery of the rotor. By radial is meant substantially at right angles to the direction of travel or radial to the general axis or center of rotor rotation. For this purpose there is provided, for each pocket, an outstanding or radial pocket-support or base 88, shown in the form of a radial rod, which is inserted and fastened within the aperture 67 in each of the internal bosses of the peripheral wall or rim 65 of the rotor. Thus, in the illustrated case, there will be sixty of the pocket supporting brackets or rods 88, each of which serves to hold the walls of the pocket 89, as will be described in detail, the rod preferably serving as an axle for certain pocket operations or movements, and the rod also preferably being hollow so as to serve as pneumatic passage for certain operations to be performed through suction.

Essentially each of the pockets 89, arranged substantially radially to the general axis of notation and projecting from the rotor, comprises a pair of side walls between which is enclosed the pocket space; and the pocket formed by these opposite walls is initially wide open at its top but closed at its bottom, so as safely to receive and hold the newspaper sections deposited from above. For convenience the opposite pocket walls may be designated the leading wall 90 and the trailing wall 91, since, as radially arranged, the two walls so designated travel around the orbit with the wall 90 in advance of the wall 91.

During the travel of each pocket it goes through operations which in principle may be described as follows. There is means which operates to separate or swing apart the two halves of the newspaper jacket section so that the section thus opened can rest within the pocket in V-form, in which condition it is held during the depositing or stuffing of the remaining sections within the jacket; and beyond the point where these operations are completed the normally closed bottom of the pocket is caused to open thereby to dump or deliver downwardly, at the outfeeding position of the machine, the completed stuffed newspaper, for outfeeding or disposal in other desired manner. In Fig. 5 the walls are advancing toward the observer.

These objects are efficiently and simply provided by the disclosed construction wherein one of the pocket walls is movable for the purpose of taking part in the opening of the jacket section, and one of the walls is relatively movable for causing the opening of the pocket bottom for delivery purposes. Preferably both of these actions are provided by movements of the same wall, which thus is equipped with a double-jointed swinging action. Specifically the leading wall 90 is shown as a relatively fixed wall, mounted rigidly upon the pocket supporting rod 88, while the trailing wall 91 is doubly pivoted or swingable to take part in the receiving, manipulating and delivering operations.

Furthermore, the pocket fixed wall 90 is preferably substantially vertical as shown, while the movable wall 91 is adapted to swing between a vertical position adjacent to the fixed wall and a trailing inclined position wherein the two walls present a V-shape pocket, the moving wall also having a suitable motion, such as a tilting motion about a central axis, for pocket opening and delivering purposes.

The pocket fixed wall 90 is seen in Figs. 5 and 14 to be attached in upright position upon the pocket supporting bracket rod 88. The wall is formed with a bent foot portion 93, Fig. 14, composed of several tabs between cutaway portions as seen in dotted lines in Fig. 5; and the wall may be held fixed by having its foot welded to the bracket rod 88, which also is preferably secured fixedly in its hub 66 on the rotor. At its upper inner portion the wall 90 is formed with a slanted edge 94, this slant conforming with the incline of a supplemental guide wall 95, which may be a fixed or traveling strip of metal, extending around the entire path of travel, provided to assist the downward guiding of the newspaper sections into the pockets.

The upright fixed wall 90 of each pocket also is provided with means to take part in the opening of the jacket section, and for this purpose its upper margin 96, or a substantial portion thereof is bent away from the pocket interior, substantially to a 60° angle, the line of the bend preferably commencing at the upper inner corner of the wall and slanting outwardly to a substantially lower point, as well seen in Fig. 5, thus presenting an elongated triangular bent-away margin 96; and this margin, near its outer end, is perforated with a hole 97 of ample size to accommodate the action of the suction holding device shown in Figs. 5 and 11, to be later described.

Coming next to the movable pocket wall 91, this has a bent-over, triangular top marginal portion 100 corresponding in general with but of lesser height than the bent wall portion 96 of the fixed wall. The two bendings of the respective pockets cooperate in the opening of the jacket section of the newspaper which, at its upper margin, is bent over or thrust by the bent margin 100 of the movable wall when that wall is swung to upright position, the section being thus compelled to bend over against the inner surface of the bent margin 96 of the fixed wall. This will bring the upper outer corner of the leading half of the newspaper section forcibly against the margin 96, and against the suction holding device positioned in the hole 97 thereof. The jacket section will have been deposited in the pocket in such way that its folded back edge will be at the same outer end of the pocket as is the suction device in hole 97. The result of this arrangement and operation, as will be further described, is that when the trailing wall swings away, retracting to open position, the leading newspaper half-section will be held by the suction device and thus remain vertical, while the other or trailing half-section falls away therefrom, by gravity, supplemented if desirable by mechanical means, so as to rest against the movable pocket wall in its open position. The jacket section is thus held in its V-form at least long enough to receive all of the inner newspaper sections to be deposited therein. If desired the suction holding device may be supplemented by a mechanical catch or hook 139, later described on Fig. 12, arranged to be applied over the top of the upright pocket 90 and the top margin of the leading half of the jacket section, thus to insure that that section remains open throughout the depositing operations, until released in time for delivery.

The movable wall 91 of each pocket is shown specifically constructed with its bent-over top margin 100 as described and with certain other features as will now be described. The movable wall preferably has two movements, first, the swinging upwardly to the fixed wall and return therefrom, about a low axis determined by the position of the bracket rod 88, and second, a tilting motion about a horizontal axis located well above the lower edge of the wall. For these purposes the structure may be as follows. The movable wall has an eared lug 102 at its trailing or outer side, the ears being in the nature of bearing rings surrounding and rotatable upon a horizontal axle 103, being the axle about which the tilt of the wall occurs. This axle is arranged to swing bodily for the purpose of swinging the wall bodily about its low axis, and for this purpose the axle 103 is mounted upon and forms part of a swinging structure or frame 103-104-105, adapted to rock upon the underneath fixed bracket rod or axle 88. The structure is best seen in Fig. 5 and in Figs. 12 and 13. The swinging frame comprises a swinging arm 104 at the inner end of the axle 103 and a similar arm 105 at the outer end thereof, both of these arms being secured tightly upon the upper axle 103 but mounted loosely upon the fixed bracket rod 88. The swinging or rocking action may be effected through the arm 104, constituting part of a rocklever. This lever has a hub 106 turning loosely on the bracket rod as already described. Extending upwardly from the horizontal axle 103, and fixed thereon to constitute substantially a continuation of the lever arm 104 is an extension or stop finger 107 which is normally contacted by the movable wall 91 and determines its position on its swinging frame. The wall however may tilt away from this position and is provided with a spring 108 whose function is to hold the wall yieldingly in its stopped position. The spring might be arranged upon the axle 103 or elsewhere, and for purposes of illustration it is shown as pulling outwardly upon the upper portion of the wall above the axle, the yield permitting the wall to be tilted for the action of opening the bottom of the pocket for delivery, as seen at position 4 in Fig. 12. To bring about this tilting motion each movable wall 91 is provided with a pair of ears 110 carrying a roller 111, which may be relatively thrust to tilt inwardly the upper part of the wall and open the bottom of the pocket, against the yielding pull of the spring 108. This action may be brought about by swinging outwardly the horizontal axis 103 and arm 104 to an abnormal extent, causing the roller 111 to strike a relatively fixed abutment 112, which is shown detached but may be mounted in the illustrated position by suitable bracket means carried by the webs or walls 62 or 65 of the rotor, or by the bracket rod 88, or the fixed wall 90 of the next adjacent pocket, as shown. By these arrangements each movable pocket wall is capable both of swinging to open and close the top of the pocket and tilting to open and close the bottom of the pocket; and operating about the axles 88 and 103 it may be described as a double-jointed action. The rocking lever arm 104 must be shaped to clear and avoid conflict with the sector web 62.

For causing these wall movements the lever arm 104 of the wall supporting frame is shown as having a down extension 114, below the hub 106. This extending lever arm is shown pulled advancingly by a strong tension spring 115, tending to open the pocket. The timed actuation may be through a roller 117 on arm 114 constituting a follower running upon an actuating means shown as a stationary cam 118, see Figs. 5 and 12. This cam may consist of successive cam sections arranged beneath the periphery of the rotor but is preferably a continuous large circle, as shown, and mounted on a series of base brackets 119.

In Fig. 12, which is a development showing the salient pocket positions 1, 2, 3 and 4, the stationary cam 118 is shown as broken away at certain points for condensation, and it is provided with a series of reference letters $a$ to $h$ to indicate the different active and passive portions of the cam arranged to produce timed operation of each of the successive pockets in coordination with the deposit of newspaper sections from the successive supply means or hoppers. Thus, in Fig. 12, the rollers 117 of the various pockets advance leftwardly along the active surface or top edge of the cam, shown as developed at length. The cam surface $a$ or 118$a$ is a low dwell, the pocket therefore resting in open position as it passes through position 1, whereat it receives a jacket section A, and the figure shows the jacket section with its two half-sections closed, resting against the inclined movable wall of the pocket.

The position numbers as marked on Fig. 12 correspond with those marked on Fig. 1, where the action may be supplementally followed. At position 2 the hopper or infeed mechanism is omitted, and the interval between positions 1 and 3 is utilized for opening the jacket section to receive the inner sections. Thus the cam 118, beyond its dwell $a$, has a rise $b$ to a peak $c$ and thence a drop $d$. During this interval therefore the follower roll 117 is lifted, and the lever 104 carrying the movable wall is swung inwardly, or toward the fixed wall, so that the jacket section becomes squeezed between the two walls, as seen at position 2 in Fig. 12. The bent top marginal portions of the two walls cooperate in the manner already explained to bend over the upper margin of the jacket section upon the leading wall until the leading half of the section comes in contact with and causes the operation of the suction holding device, which thereupon grips and holds in vertical position the leading half of the section; following which, with the return of the movable wall the trailing half section falls away to the same inclined position it occupied at position 1. Thus the jacket section is brought into V-shape as seen in position 3 on Fig. 12. The action of the suction device will be further explained in connection with Fig. 11.

Following the drop $d$ of the cam 118 is a prolonged dwell $e$, and during this period the pocket remains open as seen at position 3; and in this position each pocket travels around beneath any desired number of section depositing means or hoppers, such as the seven shown in Fig. 1, or any portion thereof. In Fig. 12 at position 3 a single inner section has been deposited within the jacket section, and with further travel further inner sections will be deposited; Fig. 13 showing two inner sections within the jacket section, the second of which has just been deposited.

After all of the desired sections have been deposited each pocket comes to position 4, and at this position the cam roller 117 passes off from the dwell $e$ down a rapid incline $f$ on to a lower dwell $g$. This supplemental drop of the follower causes the two-armed lever 114, 104 to swing abnormally outwardly, to the right in Fig. 12, so that the contact roller 111 near the top of the movable wall 91 is brought into operative contact with the abutment 112, the abutment constituting a stop preventing outswing of the upper part of the wall beyond its normal position, thus compelling the wall to tilt from the inclined position of position 3 to the upright position shown at position 4, the result of which is that the pocket, previously closed at the bottom, is opened widely, so that the completely stuffed assemblage C is released and passes down out of the pocket for final delivery therefrom.

Before the pocket bottom opening and delivery as thus described the deposited sections are held securely in each pocket, as shown in Figs. 12 and 13, and to make the holding more secure the lower edge of the movable wall is preferably formed with a series of tabs 99 between recesses, complementary to the tabs 93 at the foot of the fixed wall, so that the lower edges of the two walls, each substantially serrated, intermesh with each other, preventing any portion of any newspaper section from descending or escaping below the meeting point of the pocket walls, until the bottom opening of the pocket.

Beyond cam dwell $g$ is a gentle rise $h$ to the initial level $a$, acting to restore the pocket to position 1, its initial condition, and Fig. 12 shows this position duplicated at the two ends of the development. Each of the sixty pockets goes through the described cycle in each complete turn of the rotor, delivering sixty products per rotation, under control of the cam contour portions 118a to 118h.

For convenience the pocket operating and timing cam 118 is illustrated as an open or one sided cam on which the lever rollers 117 ride, the levers 114 being thrust toward the cam by the springs 115, each of which must be of strength to overcome and stretch the tilt-resisting springs 108 and ensure reliable action. In practice however the cam could advantageously be of the closed or box type, with a complementary upper edge, between which and the lower edge the rollers 117 run; such arrangement extending part or the whole way around the circumference and being especially useful at abrupt places such as the quick dumping cam part 118f. Such closed cam gives positive action and may permit dispensing with the springs 115. The upper or complementary cam edge when used may act upon the roller 117, or some other follower, such as a roller at a higher point on the lever 104, 114 or on the axle 103, to be thrust downwardly to keep the roller 117 upon the cam 118.

The delivery of the stuffed newspapers from the successive pockets, traveling in rapid succession through the delivery position 4, may thus be caused by gravity directly downward, to be suitably received as upon an outfeeding conveyor 121 shown in Figs. 1 and 2, comprising for example a conveying belt or band 121 which is driven and travels around pulleys or rollers 122, the speed being preferably such that the delivered newspapers are laid in overlapping relation as seen in Fig. 2. In Figs. 1 and 2 the outfeed is shown as extending rightwardly from the delivery point, but the conveyor 121 might equally well be arranged for travel leftwardly therefrom, depending upon the needs in any particular instance; or two such conveyors may be used, traveling rightward and leftward from the delivery position, for alternate use.

The means for holding the leading half section of the jacket section against the leading pocket wall during travel beneath the several infeeding means at the stations or positions numbered 3 might be of various kinds, such as mechanical, but is preferably pneumatic and is shown specifically as a suction holding device 124 arranged at and to project slightly through the hole 97 of the bent margin of the upright wall of each pocket, this device being particularly illustrated in Figs. 5 and 11. It serves to hold the leading section half upright while the other half falls away to give the section the desired V-form, and the suction arrangement may be supplemented by a clip or other operative means 139 to be described to reinforce the holding of the upright leading half section until the stuffing has been completed. The holding device 124 is shown as mounted at the outer side of the vertical pocket wall 90 by means of an attached plate or bracket 125 standing out from the wall and having attached to it a block 126 which is centrally open and accommodates the body of the suction device.

The suction device itself might be in different forms, for example with remote control of the suction thereto, but there is specifically shown an advantageous suction device wherein the control is very close to the point of contact with the paper section, and indeed is self-acting in the sense that no timing means is necessary, the pressing of the paper section against the suction nozzle sufficing to bring the holding function into play. Fig. 11 best shows the structure, the part of the device which projects through the hole 97, and is therefore accessible for contact by the newspaper section, being a nozzle or cup-shaped suction terminal 128. It may be here pointed out that the bent upper margin of the trading wall is constructed, shaped, perforated or abridged, particularly at its outer corner, so as not to be able to make contact with the projecting nozzle when a pocket may be empty, for such contact and pressure, as will later appear, would admit outside air to the suction passages and so impair the operation.

Describing the suction holding device 124 in detail there is shown a movable member 129 carrying the terminal cup 128 and being in the nature of a piston or diaphragm, operating within the walls 130 of a walled chamber containing a suction space 131. The suction cup at one end projects through the pocket wall sufficiently to be able to be thrust for a short distance by the pressure of the newspaper section against it, while the device at the other end is shown with chamber walls of reduced diameter, coupled or connected directly with a suction tube 132 leading from other passages and control means as will be described. The sliding piston 129 is shown as formed with a preferably central suction passage 133 leading to the cup, with radial extensions leading to the chamber suction space 131. At a suitable point in the chamber wall, for example at the remote end, is a suction port 135 constituting also a valve seat for controlling the flow of air from the chamber to the source of suction. Engaging the valve seat is a valve gate or disk 136, at the outer side of the seat, so that the pulling effect of the suction tends to retract outwardly the movable gate, to open the valve. A mechanical connection is provided between the movable valve gate and the movable piston 129, and this is advantageously embodied in the form of a stem or link 137 arranged interiorly, and thus extending from the valve to the piston through the suction space within the chamber. In order normally to hold the valve closed against the tendency of the suction to open it a resilient or spring means is provided, being shown in the form of a helical spring 138, enclosed within the larger diameter of chamber and pressing the piston outwardly, toward the newspaper section, thus at the same time pulling the valve gate to its seat; the spring being of adequate strength normally to close the valve and hold it closed to avoid loss of suction by the entry of air through the valve into the suction pipe 132. As thus arranged the valve seat 135 is the stop for the spring thrust.

The described suction holding device is thus availed of for manipulating a portion of the newspaper jacket section, and its principles may be available for various manipulations upon sheets, signatures or other objects of paper or like sheet material. The suction nozzle or cup is adapted to contact directly with the paper object and to suction-hold it for the purposes in hand. The valve port or seat in the suction chamber has its gate shiftable outwardly from the seat to open the valve and thereby connect the chamber with the source of suction, the connection or passages 131 and 133 supplying the suction effect to the nozzle or cup.

When the newspaper jacket section is pressed mechanically against the suction cup, the cup and piston shift or slide inwardly, and the stem communicates this motion to the valve gate, all of these parts moving in unison, against the tendency of the spring to close the valve. As a result the thrust applied upon the nozzle by contact with the object overcomes the spring resistance, causing the opening of the valve and admitting the suction effect to the nozzle, which is thus caused effectively to grip or hold the object. This occurs at position 2 as shown in Fig. 12, by the closing together of the pocket walls; and when the movable wall retracts, the mechanical pressure upon the corner of the newspaper section ceases, but the device 124 maintains its suction hold upon the section. The partial vacuum or suction within the chamber remains operative to hold the piston 129 and suction cup retracted, thus both continuing the suction action and maintaining the grip or hold upon the paper object. Later, as will be described, the object may be released prior to delivery from the pocket, by cutting off the connection to the suction and suitably permitting venting of the suction device by opening a connection to the surrounding atmosphere.

By way of supplementing the pneumatic holding action upon the leading half of the newspaper jacket section there may be provided a mechanical hook or swingable clip 139, which may be pivoted upon the outer side of the wall 96, this clip being shaped to be swung down over the edge of the wall within the top margin of the newspaper half-section, to hold it until released. The pivoted hook 139 may have an operating extension or finger 140 adapted to be struck at a proper point of time to apply the hook, and for this purpose a fixed contact or roller 141 is provided, standing in the path of the finger 140 so that the advancing travel of the pocket causes the flicking of the hook into holding position, namely, in the neighborhood of position 2. The mechanical holder may have a second finger 142 to be similarly operated by a second fixed contact 143 to flick upwardly the clip or hook after all of the inner sections have been deposited thereby to reset the clip before the jacket section of the next assemblage is deposited. The hook or clip holding device may be caused to remain in either position by friction at its pivot, or by other known restraining means. The two contacts or rollers 141 and 143 may be mounted by brackets upon the headframe or otherwise.

With such a mechanical holder for the leading half-section of the jacket it may be unnecessary to continue the suction-holding thereof until the stuffing is completed. When delivery is to occur the product readily slips down, away from the clip, and may slip down from the section-holder as well, although if desirable the suction device may be vented after the stuffing to release all hold upon the paper as will be described. Or progressive loss of suction at the valve nozzle may be relied on in some cases for the release. The holder clip or hook 139 may be like a gripper, squeezing the paper section against the wall 90; and it may represent several thereof upon a common pivot shaft mounted atop the wall edge.

Suitable arrangements are necessary for supplying suction for the operation of each of the numerous suction holding devices 124, mounted on the endless train of pockets which are in continuous travel at the periphery of the rotor 51, and with certain timing in respect to the cutting-off or venting of each device to release the held section prior to the delivery of the completed product, when it is found necessary to relieve the suction to permit the paper object to be delivered out of the pocket. For these purposes a source of suction must be maintained and this is herein illustrated as a suction tube 144, seen in Fig. 5, extending from any suitable source of suction, the tube being preferably of the flexible type and descending from above so as not to be in conflict with the rotor and carried parts.

The suction distributing means is shown as comprising an upper fixed suction ring 145 and a lower rotary ring 146, mounted on the rotor; the combined rings being in the nature of a manifold with outgoing passages or tubes leading to the several pockets and to the suction devices thereof. The upper suction ring 145 is shown in greater detail in Figs. 3 and 4, and indicated in Fig. 9, while the lower suction ring is shown in detail in Figs. 8, 9 and 10. These figures show that the two rings, at their opposing peripheries, have smooth flat running surfaces and are provided with a pair of engaging shoulders 147 holding the two rings accurately in their concentric mating relations.

Figure 3:
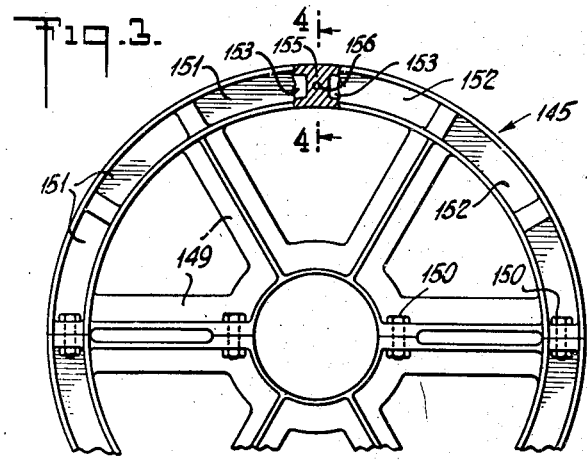
Figure 4:
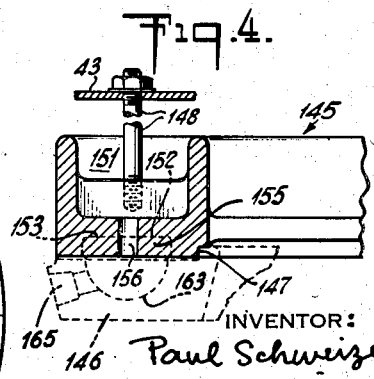

The upper suction ring 145 is fixedly mounted, for example by bolts or brackets 148 depending from the headframe bottom piece 43. This ring is constructed with spokes 149 extending from a central hub to the operative rim. As a matter of structure the ring is preferably made in two parts, as seen in Fig. 3, secured rigidly together by bolts 150. The rim or ring portion of this member has substantial height and at its upper side is preferably cored out with an annular recess 151, which however is idle, being open above, and having strengthening cross walls within the recess. Below the recess 151 is a relatively thin horizontal wall 152, below which is a continuous under-channel 153 extending entirely around the ring except for a short interruption whereat the channel is filled or occupied by a barrier of metal 155 as will be described. To communicate suction to the upper or fixed distributing ring 145, the horizontal wall 152, at one or more points, is bored to receive a threaded pipe or nipple 154, to the upper end of which is coupled the flexible suction tube 144, thereby supplying suction to the continuous channel 153.

For the purpose of providing a suction cut-off and venting action for the suction holding device of each of the pockets, at a certain point in the travel of the pocket, after the newspaper therein has been completely stuffed, the otherwise continuous under-channel 153 of the fixed suction ring is interrupted by being occupied with a blocking element 155, preferably of metal and preferably integral with the ring itself. In other words the cored or milled channel 153 is extended clear around the upper ring excepting at the designated point corresponding with the desired position of cut-off of the suction device of each pocket. Through this element or block 155 is formed a vertical passage or vent 156, leading therefore from the lower suction ring through the horizontal wall 152 to the atmosphere above. As already stated, the cut-off of suction, without venting, may sometimes suffice for the release of the leading half-section of the jacket.

The lower suction control ring 146, like the upper ring, is preferably made in a plurality of segments, two being shown, Fig. 10, and these are united to each other as seen in Figs. 8 and 9 by means of screws 160, access to the heads of which is had within those of the suction cavities to be described which are adjacent to the division line between the two segments of the ring. The lower ring, thus united, is mounted upon the rotor, and preferably atop the tall inner webs 61 of the rotor sectors 60, or certain of them, and for this purpose countersunk screws or bolts 161 are applied, extending down through the body of the ring, between cavities, as seen in Figs. 8 and 9.

The lower suction ring is provided, at its smooth upper surface where it runs in engagement with the fixed upper ring, with a complete series of separate suction cavities or sinks 163, these registering with the under-channel 153 of the upper ring, for suction connection between the fixed and the rotating parts. In the illustrated case of 60 pockets there may be 60 of such cavities or depressions 163, arranged in uniform fashion around the otherwise continuous upper surface of the ring, as indicated in smaller scale on Fig. 10 and in greater detail in Figs. 8 and 9. By this arrangement each cavity 163 maintains a continuous connection with the source of suction, as it travels around the circuit, excepting at the point where the under-channel of the upper ring contains the barrier block 155, at which point, for a short peripheral distance, the upper ring presents an unchanneled under surface, having however the venting passage 156. Each of the cavities 163 is shown as relatively narrow, in the direction of travel, and it should be of somewhat less width than one-half of the corresponding dimension of the block 155, so that at no point of the travel of any cavity 163 can it operate to afford a direct suction connection between the vent hole 156 and the uninterrupted portion of the under-channel 153 of the upper ring which, if this occurred, would cause a loss of suction.

Completing the description of the rotary lower suction ring 146 it is shown as having, at each of its cavities 163, an outgoing passage 165, bored in the outer wall of the ring and threaded to receive a nipple 166 which in turn is attached by a coupling 167 to a suction tube 168 extending eventually to the suction holding device of the corresponding pocket. Each tube 168, which may be of rubber or metal, flexible or rigid, is seen in Fig. 5 as extending radially outward, along a rotor sector 60 to where, at its outer end, it is connected by a coupling 169 to the closed inner end of the hollow bracket rod 88 of the pocket, acting as a pipe for suction purposes. The suction flow therefore extends through the suction passage 170 within the radial pipe 88, and at the outer end of 170 is provided a second coupling 171, preferably with an elbow, with which is coupled also the upwardly extending tube 132 already mentioned, and shown in Fig. 11, as communicating the suction effect to the suction holding device 124 of each of the pockets.

By this described arrangement there will be for example sixty of the radial suction connections from the controller or manifold 145, 146 to the suction holding devices mounted on the upright walls of the sixty travelling pockets. The entire number of these connections to the suction device may be under constant suction, from the source to the suction devices, with the exception of the one device and its connections which are in position to be cut off by the closing of the cavity 163 of the ring 147 by the block 155 of the ring 145; the suction device which is in this position being not only cut but preferably vented by the admission of air through the vent hole 156 for the release of the suction device and the newspaper section held thereby. This plan is simple and effective since the control actions of each suction device occur at the point of application of the holding suction to the object or newspaper. No valves are required other than the valve 136 in the suction device and the venting block 156 acting as a valve, once in each cycle, as to the suction cavities in the distributing ring 146. There is no loss of suction at either point, for the reasons already explained, and the only admission of air is the negligible amount admitted by the vent hole 156 for the purpose of releasing each suction holding device when its pocket comes to the point that the completed product is to be delivered therefrom.

Outlining the total cycle of operation from the viewpoint of a single one of the newspapers being stuffed, the first infeed mechanism extracts from the stack of jackets a single jacket section and deposits it downwardly, to be received in a given one of the traveling pockets, the top of which stands open as it moves under the depositing point at position 1, while the cam dwell 118a is in effect. The jacket or cover section is received with its final or refold A' down and with its backfold $A^5$ near the radially outer end of the pocket, and therefore with part of the backfold at the upper corner $A^6$ facing the hole 97 in the outbent top margin of the upright pocket wall; the jacket sections being stacked in the hopper in such manner as to afford this result. The section so received at first rests wholly against the slanted trailing wall, as seen in Fig. 12 at position 1, with the section closed about its refold A'. The cam slant 118b then comes into action to swing the trailing wall to close the pocket, and at position 2 the top margin of the jacket section has been bent over upon the outbent top margin of the leading wall, the pressure of the section at the corner $A^6$ thrusting the suction cup, and the piston and valve gate, thus admitting suction to the holding device and thus affording pneumatic gripping for holding the leading half of the jacket section in contact against the leading pocket wall. The cam slant 118d now causes again the opening of the pocket to position 3, the jacket section at the same time, by gravity action or otherwise, as by brush 98, opening into V-form, ready to receive inner sections. With the pocket in this position 3 there is a prolonged dwell 118e, during which the jacket section receives from successive stacks any desired number of inner sections of newspaper, deposited into the pocket by the successive infeeding mechanisms. After the completion of these stuffing actions the cam part 118f causes excessive outswinging of the lever carrying the trailing pocket wall, so that said wall tilts about an interior axis into position 4, with the pocket bottom widely open for the delivery downwardly of the completed product, which is received upon the outfeeding conveyor 121. After a short dwell 118g the cam part 118h restores the trailing wall to initial position and the parts resume position 1, completing the cycle of operations, as the given pocket completes its circuit of the orbit, becoming ready to receive the jacket section for another newspaper.

It may be further explained as to the suction holding device that the extent of projection of the suction nozzle through the bend of the pocket wall 90 may be of the order of ⅜ inch, but as little as 1/32 inch displacement or depression may be sufficient to thrust the piston and stem to open the valve and admit suction below the piston, which is of enlarged diameter with atmospheric pressure above. The result is that the partial vacuum, in effect, pulls forcibly down upon the piston, overcoming the spring to the full extent of the piston's motion or clearance, and thus perpetuating its suction hold upon the object or newspaper, until later the hold is relaxed by venting or other means.

The various motions are so smooth and free from complication that they may be and have been performed in a cycle of 20 seconds; in the case of the illustrated rotor the rotations may thus be 3 per minute, and with sixty pockets the machine can deliver 180 products per minute; a rate which, by hand, would require a prohibitively large number of workmen and a large floor or shelf area for laying out, arranging, selecting and assembling the newspaper sections, with great possibility of errors that are practically eliminated by the machine.

The invention is not intended to be restricted to the illustrated arrangements, mechanisms, devices and operations, since they may be variously altered or modified within the novel principles. For example, the drive of the extractor drums may be by a relatively small diameter gear, within the headframe, the shafts 26 being extended inwardly thereto. Each shaft clutch 27 may be a safety clutch, self-releasing in case of obstruction at the drum; and it may be a one-point clutch, thus to restore correct drum timing, relative to the pocket travel, when operation is resumed. The so-called two-up system of operation, known in gatherers, may be used. For example, with a newspaper comprising only a jacket and not more than three inner sections, the loading may be with each inner section occupying two successive hoppers, thus utilizing seven hoppers; in which case these two-up infeeder hoppers and drums are geared down to half speed and each timed, by adjustment of the clutches 27, to deposit inner sections in alternate pockets, in staggered manner. Capacity and ease of loading are thus improved.

The pocket walls 90 and 91 were described as having intermeshing tabs at their lower edges, the recesses between which may extend substantially above the hollow supporting bracket rod 88. By this structure each pocket at position 1 can be given a sharply acute inside contour, to receive the dropping jacket section with a wedging action, without blow or bounce; but with the pocket opened more widely for further deposits, affording an ample space to accommodate the folds of all of the sections. This difference is obtained by designing the contour of the cam 118, to be slightly higher at 118a than at 118e.

The suction device 124 may be modified by reversing the skirt of the piston 129, so that the closing spring 138 may be lengthened to extend between the skirt and the hollow axial link or connection 137. Further the shoulder against which the piston may strike when thrust inwardly may be faced with a rubber ring, and the piston provided with an annular end or rib to seat against the rubber ring and thus better maintain the suction condition, preventing any leakage between piston and cylinder when the valve 135, 136 is open. This permits ample working clearance or loose fit between cylinder and piston and therefore easier and quicker piston movement. Also, the valve disk or gate 136 may be of rubber, the better to avoid loss of suction when it seats against the port 135 when the spring holds closed the valve.

A simplification and improvement of the suction controlling rings 145 and 146, may generally simplify the suction distribution system, as follows. The distribution of suction from the rings to the sucker devices 124 may be in groups, instead of individually as shown. For example, each sector 60 is shown as carrying five pockets and five suction connections through pipes 168 and passages 170 to the respective suction devices, and these five may constitute a group, all serviced by a single prolonged cavity 163 or port in the rotary suction ring 146. This permits an advantageous reduction in the diameter of the suction rings, and allows larger connections and freer flow of air toward the suction source. These advantages are possible due to the self-closing character of suction device 124, and because of the extended idle travel from the final position 3, whereat the final hopper mechanism is located, to the delivery position 4, this covering substantially 90° of the complete orbit of pocket travel. When all five pockets of one group, on a single sector, have passed beyond the final hopper, the suction may then be cut off from this entire group, fed by a single prolonged cavity 163 in the rotary ring, the cut-off being effected by a prolonged block 155 in the stationary ring. With such an arrangement the venting of the individual sucker devices is unnecessary. When the distributing port or cavity 163 in the lower ring emerges from the cut-off zone, suction is then promptly supplied again thereto, and to all five of the traveling pockets, this occurring before the first of this group of pockets reaches position 1 for the starting of a new operation by the reception of a new jacket section of newspaper. Each distributing cavity 163 in the ring 146 may have a single outlet passage, this leading to a manifold with five outgoing passages or tubes 168 extending, as before, to the suction connections of the five pockets of the group.

There has thus been described a stuffing machine embodying the principles and attaining the objects and advantages of the present invention; but since many matters of operation, combination, construction and detail may be variously modified without departing from the underlying principles, it is not intended to limit the claims to such matters except to the extent set forth in the appended claims.

What is claimed is:

1. Machine for stuffing newspapers or like assemblages by insetting loosely within the folded jacket section one or more inner sections thereof, comprising an endless series of upright open-top conveying pockets with carrier mechanism to guide and advance the same around a horizontal orbit, a plurality of section feeding means operative at predetermined section receiving stations along such orbit and adapted to feed downwardly into each pocket during travel first a jacket section and therebeyond one or more inner sections, and means for opening the jacket section into V-form in each pocket before the reception of inner sections therein; each pocket being normally closed at bottom to retain received sections but openable for gravity delivery of the stuffed assemblage therefrom, and means for causing such bottom opening of the successive pockets upon each thereof reaching a predetermined delivery station beyond such receiving stations thereby to deliver downwardly the successive stuffed products to an outfeeding means.

2. A stuffing machine as in claim 1 and wherein each open top pocket has opposite side walls in V-shape arrangement and is openable at bottom by the ability of the walls to shift or swing relatively apart.

3. Machine for stuffing newspapers or like assemblages by insetting loosely within the folded jacket section one or more inner sections thereof, comprising an endless series of walled upright conveying pockets normally open above with a rotor to carry and advance the same with continuous travel around a circular horizontal orbit, a plurality of section feeding means operative at predetermined section receiving stations around such orbit and adapted to feed downwardly into each pocket first a jacket section and therebeyond one or more inner sections, and means for opening the jacket section into V-form in each pocket before the reception of inner sections therein; each pocket being normally closed at bottom to retain received sections but being openable by the shift of a pocket bottom part for gravity delivery of the stuffed assemblage therefrom, and means for causing such bottom opening of the successive pockets upon each thereof reaching a predetermined delivery station beyond such receiving stations thereby to deliver downwardly the successive stuffed products to an outfeeding means.

4. A stuffing machine as in claim 3 and wherein the series of pockets is arranged at the rotor periphery with the pockets in sidewise juxtaposition and substantially radially so as to travel sidewise around the circular orbit.

5. Machine for stuffing newspapers or similar sheet material assemblages by insetting loosely within the folded outer or jacket section of each assemblage one or more inner sections thereof, comprising an endless train of assemblage conveying pockets with carrier mechanism for advancing the same around a substantially horizontal endless orbit for each pocket to receive first a jacket section and then inner sections at predetermined receiving stations along the travel path and to discharge the completed assemblage at a subsequent delivery station; with infeeding means at such receiving stations; each pocket comprising a pair of relatively movable walls presenting normally a receptacle closed below and open above to receive and hold edgewise the jacket section with its fold downward and therewithin the inner sections of the assemblage; and means for relatively moving or swinging the walls of each pocket as it advances around the orbit to cause the walls, first, beyond the jacket depositing station to close together above and thereupon to reopen thereby to cause the jacket section to be opened and supported in V-form, and second, beyond the last of the other receiving stations to open below thereby to discharge the assemblage at the delivery station, and third, therebeyond to close below thereby to resume initial receiving position before arriving again at the jacket receiving station; together with means associated with said walls to assist in opening the jacket into V-form when the walls reopen.

6. A stuffing machine as in claim 5 and wherein each of the pockets stands outwardly substantially radially with respect to the orbit axis from the pocket-carrying mechanism so as to travel in sidewise juxtaposition around the orbit; and wherein each pocket comprises relatively movable walls, the first of which is normally upright, the second wall being normally inclined in V-form relation to the first wall; and wherein the jacket opening means comprises means to swing the second wall upwardly to press the jacket against the first wall and then return to normal, and means for holding one half of the jacket to the first wall while the other half returns with the second wall to inclined position, thereby opening the jacket section into V-form to receive the inner sections of the assemblage.

7. A stuffing machine having a series of section conveying upright pockets traveling a horizontal orbit through receiving positions for the jacket section, and therebeyond for the inner sections, deposited edge therein, and means for infeeding sections downwardly into such pockets at such receiving positions; each pocket consisting of a pair of opposite walls initially in V-form with the pocket open at top and closed at bottom, said walls being relatively swingable or tiltable to close the pocket at top and to open it at bottom; at least one of the walls being so swingable about a low axis to close the pocket top and to return thereby to assist opening the jacket section into V-form, with means causing one half of the jacket to rest against one wall while the other half rests against the other wall; and at least one of the walls being so tiltable about a higher axis to open the pocket bottom thereby to assist dumping the stuffed assemblage for delivery.

8. A stuffing machine as in claim 5 and wherein each of the pockets stands substantially radially with respect to the orbit axis so as to travel in sidewise juxtaposition around the orbit; and wherein each pocket comprises relatively movable walls, the first of which is substantially upright, the second wall being normally slanted in V-form relation to the first wall; and wherein the jacket opening means comprises means to swing the second wall upwardly to press the jacket against the first wall and then return to normal, and means for holding one half of the jacket to the first wall, while the other half returns by gravity to inclined position, consisting in a suction device near the top of the first wall, thereby opening the jacket section into V-form to receive the inner sections of the assemblage.

9. A stuffing machine as in claim 5 and wherein each of the pockets stands substantially radially with respect to the orbit axis so as to travel in sidewise juxtaposition around the orbit; and wherein each pocket comprises relatively movable walls, the first of which is substantially upright, the second wall being normally inclined in V-form relation to the first wall; and wherein the jacket opening means comprises means to swing the second wall upwardly to press the jacket against the first wall and then return to normal, a timed suction device for holding one half of the jacket to the first wall while the other half returns by gravity to inclined position thereby opening the jacket section into V-form to receive the inner sections of the assemblage; and a supplemental mechanical hook device having means to move it into position to hold such suction-held half after the jacket section has so opened into V-form.

10. A stuffing machine as in claim 7 and wherein both of said swinging or tilting movements are of the same wall which is initially in inclined position.

11. A stuffing machine as in claim 7 and wherein both of said swinging or tilting movements are of the same wall which is initially in inclined position; and for such movements there is provided a frame swingable on a low axis near the pocket apex, with timed means for swinging it to close and open the pocket top; and means pivoting the movable wall at a mid-axis on said frame, with timed means for tilting it; said two-timed means being timed in coordination with the travel of each pocket.

12. A stuffing machine as in claim 7 and wherein both of said swinging or tilting movements are of the same wall which is initially in inclined position; and for such movements there is provided a frame swingable on a low axis near the pocket apex, with timed means for swinging it to close and open the pocket top; and means pivoting the movable wall at a mid-axis on said frame, with timed means for tilting it; said two timed means being timed in coordination with the travel of each pocket; with spring means maintaining the tilting wall in initial position on the frame, and a contact or abutment means to tilt said wall by abnormal swing of the frame thereby to open the pocket bottom for delivery of the product.

13. A stuffing machine as in claim 7 and wherein is a fixed cam extending around the pocket orbit and operable through a follower to cause the pocket wall movements in coordination with the pocket travel.

14. A stuffing machine as in claim 5 and wherein the means to open into V-form the jacket section standing edgewise in each pocket comprises means to press the jacket upper portion against the first one of two pocket walls, and suction means to hold one half of the jacket against said first wall while the second half returns to inclined position against the second pocket wall; said suction means consisting of a suction holding device with a nozzle positioned to be contacted and closed by the pressure of the first jacket half against the first wall.

15. A stuffing machine as in claim 5 and wherein for opening the jacket section into V-form is a suction device to hold one half of the jacket against one pocket wall while the other half swings away therefrom, the suction holding device comprising a suction chamber, a piston or equivalent movable therein and carrying the jacket-holding nozzle, a valve port and seat in a chamber wall with valve gate openable toward the suction source to supply suction to the chamber, a passage from the chamber to the nozzle to supply suction for holding the jacket half section, a mechanical connection between the piston and valve gate whereby inward displacement of the nozzle and piston causes opening of the valve, and a spring adapted to thrust outwardly the piston and thereby close the valve when the nozzle is open to the atmosphere but to yield when the nozzle is closed by the jacket and pressed inwardly, thereby to open the valve and apply the suction to retain open the valve and maintain suction hold on the jacket, until released by venting or otherwise.

16. A stuffing machine as in claim 5 and wherein the means to open into V-form the jacket section standing edgewise in each pocket comprises means to press the jacket upper portion against the first one of two pocket walls, and suction means to hold one half of the jacket against said first wall while the second half returns to inclined position against the second pocket wall; said suction means consisting of a suction holding device with a nozzle positioned to be contacted and closed by the pressure of the first jacket half against the first wall; the first wall top margin being outbent and being apertured near an upper corner to accommodate the suction nozzle, and the second wall top margin being inbent to cause the bending over of the jacket top margin against the first wall and suction nozzle.

17. Machine for stuffing newspapers or like assemblages by insetting loosely within the folded jacket section of each assemblage one or more inner sections thereof, comprising an endless series of upright open-top section-conveying pockets each composed of leading and trailing walls and having mechanism to guide and advance the same in procession around a horizontal orbit, and with the pockets arranged substantially radially with respect to the orbit center or at right angles to the orbital path thereby to travel sidewise in sidewise juxtaposition; a plurality of section feeding means operable at predetermined section receiving positions along such orbit and adapted to feed downwardly into each pocket during travel first a jacket section and therebeyond one or more inner sections; means for opening the jacket section into V-form in each pocket before the reception of inner sections therein; and means operable thereafter for causing delivery of the completed products from the successive pockets at a predetermined time and in a delivery position beyond such receiving positions.

18. A stuffing machine as in claim 5 and wherein for opening the jacket section into V-form is a suction device to hold one half of the jacket against one pocket wall while the other half swings away therefrom, the suction holding device comprising a suction chamber, a piston or equivalent movable therein and carrying the jacket-holding nozzle, a valve port and seat in a chamber wall with valve gate openable toward the suction source to supply suction to the chamber, a passage from the chamber to the nozzle to supply suction for holding the jacket half section, a mechanical connection between the piston and valve gate whereby inward displacement of the nozzle and piston causes opening of the valve, and a spring adapted to thrust outwardly the piston and thereby close the valve when the nozzle is open to the atmosphere but to yield when the nozzle is closed by the jacket and pressed inwardly, thereby to open the valve and apply the suction to retain open the valve and maintain suction hold on the jacket, until released by venting or otherwise; and wherein is a manifold distributing means between the source of suction and the suction holding devices of the several pockets, comprising fixed and traveling suction rings, adapted to supply continuously suction to the valved chambers of all of the suction devices, and having means such that each device is cut off from the suction after the jacket is completely stuffed in time for the delivery of the product from the pocket; and with means timed in coordination with the travel of each pocket for venting its suction device to release the product after such cut-off.

19. A stuffing machine as in claim 5 and wherein the means to open into V-form the jacket section standing edgewise in each pocket comprises means to press the jacket upper portion against the first one of two pocket walls, and suction means to hold one half of the jacket against said first wall while the second half returns to inclined position against the second pocket wall;

said suction means consisting of a suction holding device with a nozzle positioned to be contacted and closed by the pressure of the first jacket half against the first wall; the said machine having a source of power drive and connections for actuating in coordination (1) the section infeeding means, to deposit a section in each pocket traveling therebelow, (2) the pocket conveyor, to advance each pocket around the orbit through each infeeding and the delivering position, (3) the several pockets, each to close and open at top following reception of jacket section and to open at bottom after reception of all sections, and (4) the suction means to cause holding of half of each jacket section from the time of the closing at top of each pocket until stuffing thereof is completed.

20. A stuffing machine as in claim 17 and wherein the guiding and advancing mechanism includes a rotor carrying many upright pockets placed radially to travel sideways around a circular orbit in close sidewise juxtaposition.

21. A stuffing machine as in claim 17 and wherein each pocket is initially closed at bottom to retain received sections but has shiftable parts rendering it openable for gravity delivery of each assemblage therefrom; and the means for causing timed delivery comprises mechanism adapted to shift the shiftable parts of the pocket when reaching the delivery position thereby to cause bottom opening thereof.

22. A stuffing machine as in claim 17 and wherein each pocket is initially closed at bottom to retain received sections but has shiftable parts rendering it openable for gravity delivery of each assemblage therefrom; and the means for causing timed delivery comprises mechanism adapted to shift the shiftable parts of the pocket when reaching the delivery position thereby to cause bottom opening thereof, with fixed cam means operable by the travel of the pocket to actuate said shifting mechanism.

23. Machine for stuffing sheet material assemblages by insetting loosely within the folded jacket section of each assemblage one or more inner sections thereof, comprising a rotor carrying with horizontal continuous travel an endless series of assemblage conveying pockets with each pocket outstanding substantially radially in respect to the general axis of rotation at the rotor periphery so as to travel sidewise, and each pocket being substantially of V-form and composed of a pair of opposite leading and trailing walls relatively swingable and adapted to receive edgewise first the jacket section and then the inner sections at predetermined receiving stations or locations along the travel path, with means to cause delivery of the completed assemblage by swinging relatively said pocket walls to dump the pocket at a subsequent delivery station; with section infeeding means at such receiving stations and outfeeding means at such delivery station; each pocket comprising said leading and trailing walls presenting normally a receptacle closed below and open above to receive and hold the jacket section with its final fold downward and therewithin the inner sections of the assemblage; and means associated with said swingable walls for opening the jacket section into V-form within the pocket before the depositing of the inner sections therein.

PAUL SCHWEIZER.

REFERENCES CITED

The following references are of record in the file of this patent:

UNITED STATES PATENTS

| Number | Name | Date |
|---|---|---|
| 1,518,522 | Krejca | Dec. 9, 1924 |
| 1,659,099 | Halvorsen | Feb. 14, 1928 |
| 1,845,412 | Hathaway | Feb. 16, 1932 |
| 1,871,707 | Klupmeyer et al. | Aug. 16, 1932 |
| 1,951,300 | Zimmer | Mar. 13, 1934 |
| 2,159,987 | Hartmann et al. | May 30, 1939 |
| 2,163,572 | Crosby | June 27, 1939 |

FOREIGN PATENTS

| Number | Country | Date |
|---|---|---|
| 316,501 | Great Britain | Aug. 1, 1929 |